United States Patent [19]

Fernandez et al.

[11] Patent Number: 5,055,132
[45] Date of Patent: Oct. 8, 1991

[54] FLOOR POLISH COMPOSITION WITH IMPROVED GLOSS

[75] Inventors: William J. Fernandez, East Brunswick; Francis L. McCarthy, Bompton Plains, both of N.J.

[73] Assignee: Eastman Kodak Company, Rochester, N.Y.

[21] Appl. No.: 501,641

[22] Filed: Mar. 29, 1990

[51] Int. Cl.$^5$ .................... C09D 101/00; C09D 4/00; C09G 1/08; C09G 1/10
[52] U.S. Cl. ......................................... 106/11; 106/3; 106/6; 106/10
[58] Field of Search ..................... 106/3, 5, 6, 8, 10, 106/11

[56] References Cited

U.S. PATENT DOCUMENTS

| | | | |
|---|---|---|---|
| 3,532,654 | 10/1970 | Finn et al. | 260/28.5 |
| 3,912,679 | 10/1975 | Bischoff et al. | 260/28.5 R |
| 3,979,352 | 9/1976 | Brady et al. | 260/33.4 R |
| 4,526,815 | 7/1985 | Hackett et al. | 427/355 |
| 4,704,429 | 11/1987 | Hackett et al. | 524/560 |
| 4,869,934 | 9/1989 | Jethwa | 427/393.5 |

*Primary Examiner*—William R. Dixon, Jr.
*Assistant Examiner*—Michael Marcheschi
*Attorney, Agent, or Firm*—John R. Everett

[57] ABSTRACT

The addition of 2-pyrrolidone in combination with a surfactant having an HLB range of 13 to 15 and a formula $C_9H_{19}C_6H_4(OCH_2OCH_2)_nOH$ in which n has an average value of 15 improves the gloss and depth of gloss of floor polish compositions.

11 Claims, No Drawings

FLOOR POLISH COMPOSITION WITH IMPROVED GLOSS

FIELD OF THE INVENTION

The invention relates to aqueous floor coating and polishing compositions.

BACKGROUND OF THE INVENTION

Gloss and depth of gloss are two attributes of floor polishes that are most perceptible to and appreciated by the consumer. It is well known in this industry that generally improvements in gloss are attempted by varying the amounts of polymer, resin, or plasticizer commonly used in floor polishes. As the gloss is increased in this manner, the degree of gloss increase diminishes asymptotically and sometimes worsens.

SUMMARY OF THE INVENTION

The present invention provides an aqueous coating composition having a pH of 7.0 to 9.6 comprising on a weight percent basis:

(a) From about 1 to 20% of an alkali soluble addition polymer comprising:
   i) from about 10 to 25% of recurring units of at least one hydrophilic monomer selected from the group consisting of acrylic acid and methacrylic acid;
   ii) from about 60 to 75% of at least one hydrophobic monomer selected from the group consisting of alkyl acrylate and alkyl methacrylate wherein alkyl has from 1 to 8 carbon atoms; and
   iii) 15 to 25% of recurring units of at least one hydrophobic monomer selected from the group consisting of styrene and monoalkylstyrene wherein alkyl has from 1 to 6 carbon atoms;
   the addition polymer has an intrinsic viscosity at 30° C. in tetrahydrofuran of about 0.12 to 0.14 dl/g: an average number molecular weight of from about 15,000 to about 20,000, an acid number between about 110 to 130 and a minimum film forming temperature below about 40° C. at pH 9 and below about 55° C. at pH 6;

(b) from about 1 to 13% of an alkali soluble copolymer of styrene and acrylic acid having a styrene-acrylic acid ratio of about 2:1 to about 3:1, a weight average molecular weight of about 8000 and an acid number of about 210;

(c) from about 5 to 15% of a fugitive plasticizer;

(d) from about 1 to 3% of a permanent plasticizer;

(e) from about 0.5 to 2.0% by weight of 2-pyrrolidinone;

(f) from about 0.5 to 2.0% by weight of surfactant having An HLB range of about 13 to 15 and the formula $C_9H_{19}C_6H_4(OCH_2CH_2)_nOH$ wherein N has an average value of about 15;

(g) from 0.01 to 0.05% by weight of a nonionic or anionic fluorocarbon surfactant;

(h) from about 0.0003 to 0.003% by weight of an antifoaming agent; and (i) sufficient water to make a composition have a total content of non-volatile solids of from about 10 to 25% by weight.

When coated on floors the compositions of the invention provide physically and optically clear coatings. The clear polish embodiments of the compositions provided by this invention are essentially water clear without any haze or discoloration. Upon application to a flooring it dries within 20 minutes, under normal humidity and temperature conditions, to a thin, clear, colorless, glossy protective film which preserves the beauty and appearance of the flooring. Floors polished with the compositions exhibit greatly improved surface shine (gloss) and clarity as perceived by panels of consumers. The compositions provide excellent protection against normal foot traffic. The composition cleans and shines the flooring simultaneously and the coating is easily removable with household ammonia and detergents. The composition has good storage stability under temperature and humidity conditions normally encountered during storage.

DESCRIPTION OF THE PREFERRED EMBODIMENTS

The essential ingredients of the coating compositions are water, polymer, plasticizer, ionic or nonionic fluorocarbon surfactant, antifoaming agent and fugitive plasticizer. The composition of the invention can be employed for the maintenance of floors comprising a variety of substrates such as linoleum, vinyl, vinyl compositions, etc., including no-wax flooring materials which, although coated with a "permanent" protective glossy coating comprising, e.g., a urethane type coating, nonetheless eventually tend to take on a dull appearance after prolonged use, particularly in high traffic areas.

The primary polishing and coating agent in the composition of the invention is a combination of a low molecular weight water insoluble, alkali soluble addition polymer and an alkali soluble resin.

The addition polymer is obtained by emulsion or solution polymerization of certain monoethylenically unsaturated hydrophilic $\alpha,\beta$-unsaturated carboxylic acids and hydrophobic monoethylenically $\alpha,\beta$-unsaturated carboxylic esters and monovinyl aromatic compounds. The addition polymer should has an average number molecular weight of from 15,000 to 20,000, an acid number from 110 to 130, a minimum film forming temperature (MFT) of or below 40° C., at pH 9 and of or below 55° C., at pH 6 and an intrinsic viscosity in tetrahydrofuran at 30° C. of about 0.12 to 0.14 dl/g. The addition polymer comprises a) from about 10 to 25% by weight of at least one hydrophilic monomer selected from acrylic acid and methacrylic acid; b) about 60 to 75% by weight of at least one hydrophobic monomer selected from alkyl acrylate and alkyl methacrylate in which alkyl has from 1 to 8 carbon atoms and can be straight or branched and c) from about 15 to 25% by weight of at least one hydrophobic monomer selected from monovinyl aromatic compounds such as styrene and monoalkyl substituted styrenes, where monoalkyl has from 1 to 6 carbon atoms and can be straight or branches, e.g., o, m and p-vinyltoluene.

The polymerization procedures, including both emulsion and solution polymerization, for preparation of the polymer employed in the invention can be prepared as described in U.S. Pat. No. 4,017,662 incorporated herein by reference. The addition polymer is employed at a concentration of from about 1 to 20% by weight of the composition.

The alkali soluble resin, prepared by solution polymerization, is a copolymer of styrene and acrylic acid having a weight average molecular weight of about 8000 and an acid number of about 210 wherein the ratio of styrene to acrylic acid is in the range of about 2:1 to about 3:1. This styrene-acrylic copolymer is commercially available from Morton Thiokol Inc. under the tradename CONREZ 500. The alkali soluble resin is employed in the composition at a concentration of from about 1 to 13% by weight of the composition.

The composition of the invention contains as essential ingredients, in addition to the primary coating agent described hereinabove, a fugitive plasticizer, a permanent plasticizer, a leveling agent, an antifoaming agent, a preservative, ammonia and water. These essential ingredients are defined more fully hereinbelow.

The fugitive plasticizer enhances the film formation characteristics of the coating, accelerates drying, improves leveling and increases the gloss characteristics of the coating. The fugitive plasticizers which are preferred are water soluble higher boiling (about 150° to 200° C.) monohydric and polyhydric alcohols: and monoalkyl and dialkyl ethers of glycols, diglycols and polyglycols where alkyl is straight or branched and has from 1 to 5 carbon atoms. Examples of such fugitive plasticizers include diglyme, 2-butoxyethanol, 3-methoxybutanol-1, the monomethyl, monoethyl and monobutyl ether of diethyleneglycol, dipropylene glycol or polypropylene glycols, ethylene glycol, propylene glycol and polypropylene glycols. A particularly preferred fugitive plasticizer is dipropylene glycol methyl ether. The fugitive plasticizer is employed at a concentration of from about 5 to 15% by weight of the composition.

The permanent plasticizer enhances film formation and the leveling characteristics of the coating and is essential to achieve flexibility and hardness of the film. Examples of suitable permanent plasticizers include butylbenzyl phthalate, dimethyl phthalate, dibutyl phthalate, triphenyl phosphate, tributoxyethyl phosphate and tributyl phosphate. Tributoxyethyl phosphate is particularly preferred, having an extremely high compatibility in the compositions. The permanent plasticizer is employed in a concentration of from about 1 to 3% by weight of the composition.

The composition of the invention contains as leveling agent from 0.01 to 0.05% by weight of a nonionic or anionic fluorocarbon surfactant. Such surfactants are well known in the polish formulation art and are commercially available, for example, from E. I. DuPont de Nemours & Co., Inc. under their tradename ZONYL ™. Suitable leveling agents are, for example, the fluorocarbon surfactants having the general formula (C a X' 2a+1) f Z, wherein a is a number from 6 to 12, X' is selected from fluorine and hydrogen, at least 55% by weight of C a X' 2a+1 being fluorine, f is a number from 1 to 8, and Z is a water solubilizing radical such that (C a X' 2a+1) f Z has some degree of water solubility. Suitable radicals represented by Z are those containing acid groups including sulfonic acid groups and their salts, substituted sulfuric acid groups and their salts and substituted phosphoric acid groups and their salts in which the substituents are preferably alkyl radicals of 1-5 carbon atoms and the like, the salts in all said salt groups preferably being either alkali metal, ammonium, alkaline earth metal or amine salts; amine salt groups; polyhydroxy groups such as glycols, polyols and the like; polyoxyalkylene groups; substituted short chain amino acid groups and their salts as defined above; carboxy acid groups and their salts as defined above; hydroxy groups; and amide groups and substituted amide groups in which the substituent is preferably alkyl of 1-5 carbon atoms. Such fluorocarbon surfactant leveling compounds are described in more detail in U.S. Pat. No. 2,937,098, incorporated herein by reference.

Other fluorocarbon leveling compounds that can be employed in the instant invention are perfluorinated alkyl-substituted cyclohexane acids and salts thereof and perfluorinated cyclohexylalkane acids and salts thereof. The acids and salts of the aforesaid leveling agents include the sulfonic acids, carboxylic acids and phosphonic acids and the alkali metal, ammonium and alkaline earth metal salts of the above acids. These leveling compounds are described in U.S. Pat. Nos. 2,593,737, 2,732,398 and 3,163,547, incorporated herein by reference.

The composition of the invention contains from about 0.0003 to 0.003% by weight of an antifoaming agent. The antifoaming agent employed is a dimethylpolysiloxane compound adapted to control foaming in aqueous systems. The use of dimethylpolysiloxane antifoaming agents in floor polishing compositions is well known in the art. Dimethylpolysiloxane antifoaming compounds are commercially available, for example from SWS SIlicones Division of Stauffer Chemical Company, under the tradename SWS, such as SWS-211, SWS-213 and SWS-214, which are aqueous emulsions containing respectively 10%, 30% and 10% of a dimethylpolysiloxane antifoaming agent having a density of 8.3 lbs/gal. and having viscosities (Brookfield RVF, Spindles 1-7) of 5000, 15,000 and 1000 respectively, SWS-211 is a preferred antifoaming agent.

The preservative employed in the composition of the invention is selected from 1,2-benzoisothiazol-3(2H)-one, halo derivatives thereof, their water soluble salts and mixtures thereof, and 3(2H)-isothiazolone derivatives, their water soluble salts, metal complexes thereof and mixtures thereof. The benzoisothiazol-3(2H)-ones are well known biocides (see U.S. Pat. No. 3,065,123) and are commercially available, e.g., from ICI Americas Inc. under the tradename PROXEL. The 3(2H)-isothiazolones are also well known biocides (see U.S. Pat. Nos. 3,761,488 and 3,870,795) and are commercially available from Rohm & Haas Company under the tradename KATHON. These preservatives provide prolonged protection of the composition against infection and hence deterioration by microorganisms thus providing for good storage stability. The preservative is employed at a concentration of about 0.0003 to 0.003% by weight.

The instant composition should have a solids content of from about 10 to 25% by weight in order to provide a coating of suitable thickness. The term "solids" as used herein refers to the non-volatiles of the instant composition, i.e., those ingredients which in combination comprise the protective coating film deposited from the instant composition. The ingredients which comprise the non-volatiles in the composition are the addition polymer, the styrene-acrylic resin, the permanent plasticizer, the fluorocarbon surfactant, the antifoaming agent and the preservative. Preferably, the solids content is about 15 to 20% by weight.

The composition of the invention contains sufficient base to provide a pH of 7.0 to 9.6. A preferred pH is 8.2 to 8.8 in which range the clarity of the coating is within about 3% of drinkable water. For some embodiments of the polish composition of the invention a pH of about 9 to about 9.6 is desired to avoid build up between previously coated layers. Ammonium hydroxide is useful in adjusting the pH although other bases may be used to good effect.

The composition of the invention can include certain optional ingredients disclosed hereinbelow.

The composition of the invention optionally can include an anionic or nonionic optical brightener, also known as a fluorescent whitening agent, in order to overcome any trace of discoloration which might develop on prolonged storage. It also provides a bluish hue, more appealing to consumer perception. Optical brighteners which can be employed include for example those of the stilbene, benzoxazole and distyryldiphenyl types, all of which types are well known in the art. The optical brightener generally will be employed at a concentration of from about 0.0001 to 0.001% by weight of the composition.

The composition of the invention optionally can include up to 0.3% by weight of formaldehyde to ensure "quick kill" of any microorganisms with which the instant composition may become contaminated, particularly during manufacture and packaging. The formaldehyde, if employed, can be conveniently added as a 37% solution in water (formalin).

The composition of the invention optionally can include up to 0.2% by weight of caprolactam as a semi-fugitive plasticizer to aid in film formation.

The composition optionally can also include up to about 1% by weight of benzyl alcohol in order to speed drying after application.

The instant composition can also include a fragrance in order to mask the odors of certain ingredients such as the plasticizer, ammonia, etc. as well as a water soluble dye to impart a pleasing aesthetic effect to the composition.

The composition of the invention can be applied to flooring using well known techniques, e.g., by mopping with a suitable mop such as a sponge mop. Conveniently the instant composition is applied with a damp sponge mop with occasional water rinsing of the mop. The composition should be applied to flooring as an even thin layer and allowed to dry thoroughly. Drying under normal conditions of temperature and humidity, will be complete in about 20 minutes.

The composition of the invention is an essentially water clear liquid having good storage stability. It has good cleaning properties and the film deposited therefrom is clear and resistant to discoloration, has a high gloss, and exhibits good wearability, scuff resistance and water and water spotting resistance. Furthermore the film is readily removed with household ammonia and detergents.

The composition of the invention is conveniently prepared as follows:

Approximately 90% of the water employed is charged into a mixing tank and with continuous agitation the following ingredients are added at 5 minute intervals: addition polymer, styrene-acrylic resin, fugitive plasticizer, permanent plasticizer, fluorocarbon surfactant, antifoaming agent, preservative and optional ingredients. Agitation is continued for 20 minutes and the pH then is adjusted to the desired value with ammonium hydroxide and the remainder of the water then is added. Agitation is continued for about 20 minutes and the composition is then filtered using a 30 micron filter.

The invention is illustrated by the following examples without, however, being limited thereto.

In the examples the gloss readings on polished tiles were carried out according to ASTM D1455-87 Standard Method for 60 Degree Specular Gloss of Emulsion Floor Polish. The test includes a determination of 20 degree specular gloss as well.

In the compositions of the examples the names of the ingredients are presented in shorthand format for convenience. Such shorthand, not otherwise described herein, should be interpreted according to the following definitions.

White and black vinyl and white and black vinyl compositions refer to floor tiles of those colors. Vinyl compositions tiles include fillers.

The addition polymer has a monomer composition of methacrylic acid (18%), butylacrylate (10%), methyl methacrylate (52%) and styrene (20%), an average number molecular weight of 18,000, an acid number of 110, a minimum film forming temperature of 40° C., at pH 9 and 52° C., at pH 6 and an intrinsic viscosity in tetrahydrofuran (30° C.) of 0.13 dl/g.

Styrene/Acrylic resin used as a solution in water, adjusted to pH 8.8 with ammonium hydroxide, of 2:1 to 3:1 ratio of a styrene:acrylic acid copolymer having a weight average molecular weight of approximately 8,000 and an acid number of approximately 210, available as a crystalline flake from Morton Thiokol Inc. under the tradename COREZ 500.

The anti foaming agent is Dimethylpolysiloxane antifoaming agent commercially available from SWS Silicones Corp.

Pluronic F-77 is polyoxypropylene-polyoxyethylene block copolymer.

Plasticizer/fragrance submix is a mixture of methyl carbitol, tributoxyethyl phosphate and a fragrance.

Resin Soln (15%) is a partial ester of styrene/maleic acid copolymer.

EXAMPLE 1

| Polish Composition 1 (Wax) | |
|---|---|
| Component | Weight % |
| Soft Water | 53.613 |
| Antifoaming agent [c] | 0.227 |
| 1,2-Benzoisothiazolin-3-one | 0.075 |
| ZONYL FSN [d] | 0.025 |
| Glycol Methyl Ether (DPM) | 7.000 |
| Fragrance | 0.100 |
| Triton N150-80% (or Igepal C0738) (nonyl phenol ethoxylate) | 1.250 |
| 2-Pyrrolidinone | 1.000 |
| Tributoxyethyl Phosphate | 1.200 |
| Butyl Benzyl Phthalate | 0.300 |
| Aqueous Addition Polymer [a] | 28.000 |
| Styrene/Acrylic resin [b] | 3.200 |
| Ammonium Hydroxide | 1.000 |
| High Density Polyethylene Wax Wax Emulsion | 1.500 |
| Nonionic propylene/maleic anhydride copolymer | 1.500 |

| | Average Gloss Reading | |
|---|---|---|
| | 60° | 20° |
| Black Vinyl | | |
| Prototype | | |
| w/ 2-Pyrol & N150 | 90.8 | 79.2 |
| w/o 2-Pyrol & N150 | 91.0 | 76.0 |
| Black Vinyl Composition | | |
| w/ | 63.6 | 17.8 |
| w/o | 55.1 | 14.3 |
| White Vinyl | | |
| w/ | 91.5 | 75.5 |
| w/o | 88.6 | 64.7 |
| White Vinyl Composition | | |
| w/ | 55.5 | 17.4 |

| | -continued | |
|---|---|---|
| w/o | 45.2 | 11.0 |

The average gloss readings were determined from replicate runs in which 5 gloss readings were taken per run. The average of the five readings are reported here. The coatings for the composition were evaluated on both the left and right side of the above tiles. The tiles were 12×12 inches.

The above gloss readings show that the composition of the invention has a higher gloss than the control compositions (w/o) particularly the 20 degree specular gloss readings particularly for the white vinyl compositions. This is also visually supported by the following clarity test in which human observers appreciated the improved gloss.

| | Clarity Test | |
|---|---|---|
| | 1st Test N = 12 | 2nd Test N = 10 |
| w/ | 12 | 10 |
| w/o | 0 | 0 |

The procedure consisted of a panelist holding a sheet of paper on which words were printed approximately 2 feet above a black vinyl tile. Half the tile was coated with composition of the invention (w/). The other half was coated with a control (w/o). Each panelist was asked on which side was the wording clearer. The clearer the wording the better the depth of gloss.

Twelve panelists were used in the first test. Ten were used in the second test. There conclusions were unanimous that the composition of the invention (w/) gave greater clarity. This test establishes that to a consumer the gloss provided by the invention is perceptibly better.

EXAMPLE 2

| Polish Composition 2 (Clear) | | |
|---|---|---|
| | Weight % | |
| | W/O | W/ |
| Soft Water | 50.880 | 48.630 |
| Kathon CG/ICP (a) | 0.050 | 0.050 |
| Formaldehyde (37%) | 0.227 | 0.227 |
| SWS-211 (b) | 0.003 | 0.003 |
| Dipropylene Glycol Ether Methyl | 7.000 | 7.000 |
| Zonyl FSN | 0.030 | 0.030 |
| Tributoxyethyl Phosphate | 1.600 | 1.600 |
| Addition polymer (c) | 31.200 | 31.200 |
| Styrene/Acrylic Resin | 7.000 | 7.000 |
| Ammonium Hydroxide (28%) | 2.000 | 2.000 |
| Ecco White Nylon FW-5 (30%) | 0.010 | 0.010 |
| 2-Pyrrolidone | — | 1.000 |
| Triton N150 (80%) | — | 1.250 |
| Total | 100.00 | 100.00 |

The gloss readings for the control composition and that of the invention was carried out as in Example 1.

| | Average Gloss Reading | | | |
|---|---|---|---|---|
| | Control (w/o) w/o 2-Pyrol & N150 | | Invention (w/) w/ 2-Pyrol & N150 | |
| | 60° | 20° | 60° | 20° |
| Black Vinyl | 84.7 | 54.3 | 87.9 | 66.7 |
| Black Vinyl Composition | 54.6 | 15.0 | 60.8 | 18.6 |
| White Vinyl | 80.0 | 36.4 | 91.7 | 51.7 |
| White Vinyl Composition | 48.2 | 11.5 | 55.9 | 14.7 |

The above gloss readings show that the gloss provided by the composition 2 of the invention is consistent with the findings in example 1.

Example 3:

| Auto-redispersible | | |
|---|---|---|
| | Weight % | |
| | W/O | W/ |
| Soft Water | 57.619 | 55.369 |
| Kathon CG/ICP | 0.050 | 0.050 |
| FD-82 Antifoam | 0.001 | 0.001 |
| Pluronic F-77 | 0.500 | 0.500 |
| Sodium Bicarbonate | 0.285 | 0.285 |
| Methyl Carbitol | 4.000 | 4.000 |
| n-Butoxy propanol | 2.000 | 2.000 |
| Addition Polymer | 27.380 | 27.280 |
| G-8-266A (Plasticizer/Fragrance Submix) | 3.550 | 3.550 |
| Ammonium Hydroxide | 1.250 | 1.250 |
| Resin Soln (15%) | 2.645 | 2.645 |
| Zonyl FSN | 0.036 | 0.036 |
| Ammonium Hydroxide | 0.784 | 0.784 |
| 2-Pyrrolidone | — | 1.000 |
| Triton N150 (80%) | — | 1.250 |
| | 100.000 | 100.000 |

The gloss readings were carried out as in the previous examples. The improved gloss results are consistent the observations made in those examples.

| | Average Gloss Reading | | | |
|---|---|---|---|---|
| | Control (w/o) w/o 2-Pyrol & N150 | | Invention (w/) w/ 2-Pyrol & N150 | |
| | 60° | 20° | 60° | 20° |
| Black Vinyl | 79.7 | 49.8 | 83.2 | 59.9 |
| Black Vinyl Composition | 50.6 | 13.1 | 61.0 | 19.6 |
| White Vinyl | 61.7 | 22.0 | 67.1 | 31.6 |
| White Vinyl Composition | 38.5 | 8.0 | 41.4 | 7.4 |

This invention has been described in detail with particular reference to preferred embodiments thereof, but it will be understood that variations and modifications can be effected within the spirit and scope of the invention.

We claim:

1. An aqueous coating composition having a pH of 7 to 9.6 comprising on a weight percent basis:
   (a) From about 1 to 20% of an alkali soluble addition polymer comprising:
   i) from about 10 to 25% of recurring units of at least one hydrophilic monomer selected from the group consisting of acrylic acid and methacrylic acid;
   ii) from about 60 to 75% of at least one hydrophobic monomer selected from the group consisting of alkyl acrylate and alkyl methacrylate wherein alkyl has from 1 to 8 carbon atoms; and iii) 15 to 25% of recurring units of at least one hydrophobic monomer selected from the group consisting of styrene and monoalkylstyrene wherein alkyl has from 1 to 6 carbon atoms;

the addition polymer has an intrinsic viscosity at 30° C. in tetrahydrofuran of about 0.12 to 0.14 dl/g: an average number molecular weight of from about 15,000 to about 20,000, an acid number between about 110 to 130 and a minimum film forming temperature below about 40° C. at pH 9 and below about 55° C. at pH 6;

(b) from about 1 to 13% of an alkali soluble copolymer of styrene and acrylic acid having a styrene-acrylic acid ratio of about 2:1 to about 3:1, a weight average molecular weight of about 8000 and an acid number of about 210;

(c) from about 5 to 15% of a fugitive plasticizer;

(d) from about 1 to 3% of a permanent plasticizer;

(e) from about 0.5 to 2.0% by weight of 2-pyrrolidone;

(f) from about 0.5 to 2.0% by weight of surfactant having An HLB range of about 13 to 15 and the formula $C_9H_{19}C_6H_4(OCH_2CH_2)_nOH$ wherein N has an average value of about 15;

(g) from 0.01 to 0.05% by weight of a nonionic or anionic fluorocarbon surfactant;

(h) from about 0.0003 to 0.003% by weight of an antifoaming agent; and (i) sufficient water to make a composition have a total content of non-volatile solids of from about 10 to 25% by weight.

2. A composition according to claim 1 wherein the addition polymer comprises methacrylic acid interpolymerized with at least on alkyl acrylate and styrene.

3. A composition according to claim 2 wherein the fugitive plasticizer is selected from the group consisting of monohydric alcohols; polyhydric alcohols; diglycols and polyglycols; and monoalkyl and dialkyl ethers of glycols, wherein alkyl has 1 to 5 carbon atoms.

4. A composition according to claim 3 wherein:

a) the fugitive plasticizer is selected from the group consisting of diglyme; 2-butoxyethanol; 3-methoxybutanol-1; ethylene glycol; prolylene glycol; polypropylene glycol; and the monoalkyl ether of diethylene glycol, dipropylene glycol and polypropylene glycol; and b) the permanent plasticizer is selected from the group consisting of benzyl butyl phthalate, dimethyl phthalate, dibutyl phthalate, triphenyl phosphate, tributoxyethyl phosphate and tributyl phosphate.

5. A composition according to claim 4 wherein the content of non-volatile solids is from about 15 to 20%.

6. The composition according to claim 5 wherein the addition polymer comprises methacrylic acid, butyl acrylate, methyl methacrylate and styrene.

7. The composition according to claim 6 wherein the addition polymer:

a) contains 18% by weight of methacrylic acid, 10% by weight of butyl acrylate, 52% by weight of methyl methacrylate and 20% by weight of styrene, and b) has an intrinsic viscosity of about 0.13 dl/g, an average number molecular weight of about 18,000, and acid number of about 110 and a minimum film forming temperature of 40° C. at pH 9 and 52° C. at pH 6.

8. The composition according to claim 1 comprising:

(a) from about 5 to 15% by weight of dipropylene glycol methyl ether;

(b) from about 1 to 3% by weight of tributoxyethyl phosphate;

(c) from about 0.5 to 2.0% of 2-pyrrolidinone;

(d) from about 0.5 to 2.0% of $C_9H_{19}C_6H_4 (OCH_2CH_2)_n$—OH wherein n has an average value of about 15; and (e) sufficient water to make a composition having a content of non-volatile solids of from about 15 to 20%.

9. The composition of any of the preceeding claims also comprising:

(a) from about 0.0003 to 0.003% of a dimethylpolysiloxane antifoaming agent, (b) from about 0.0003 to 0.003% of a 1,2-benzoisothiazol-3(2H)-one or 3(2H)-isothiazolone preservative, and (c) from about 0.01 to 0.05% by weight of an anionic or nonionic fluorocarbon surfactant.

10. The composition of claim 8 also comprising from 0.5 to 5.0% of a wax emulsion.

11. The composition of claim 8 having a pH of about 7.0 to 7.5.

* * * * *